(No Model.)  3 Sheets—Sheet 1.

J. T. HAMILTON.
LIFTING DEVICE FOR CULTIVATOR BEAMS.

No. 268,887. Patented Dec. 12, 1882.

Witnesses:

Inventor:
James T. Hamilton (No Model.) 3 Sheets—Sheet 2.

J. T. HAMILTON.
LIFTING DEVICE FOR CULTIVATOR BEAMS.

No. 268,887. Patented Dec. 12, 1882.

Witnesses:
Matt H Wiss
J. A. Bowell

Inventor:
James T Hamilton (No Model.)

J. T. HAMILTON.
LIFTING DEVICE FOR CULTIVATOR BEAMS.

No. 268,887. Patented Dec. 12, 1882.

Witnesses:
Math. H. Weiss
J. A. Burdell

Inventor
James T. Hamilton

UNITED STATES PATENT OFFICE.

JAMES T. HAMILTON, OF COUNCIL BLUFFS, IOWA, ASSIGNOR TO HIMSELF AND WILLIAM K. HOAGLAND, OF PERU, ILLINOIS.

LIFTING DEVICE FOR CULTIVATOR-BEAMS.

SPECIFICATION forming part of Letters Patent No. 268,887, dated December 12, 1882.

Application filed February 20, 1882. (No model.)

*To all whom it may concern:*

Be it known that I, JAMES T. HAMILTON, residing at Council Bluffs, in the county of Pottawattamie and State of Iowa, and a citizen of the United States, have invented new and useful Improvements in Lifting Devices for Cultivator-Beams, of which the following is a full description, reference being had to the accompanying drawings, in which—

Figure 1:
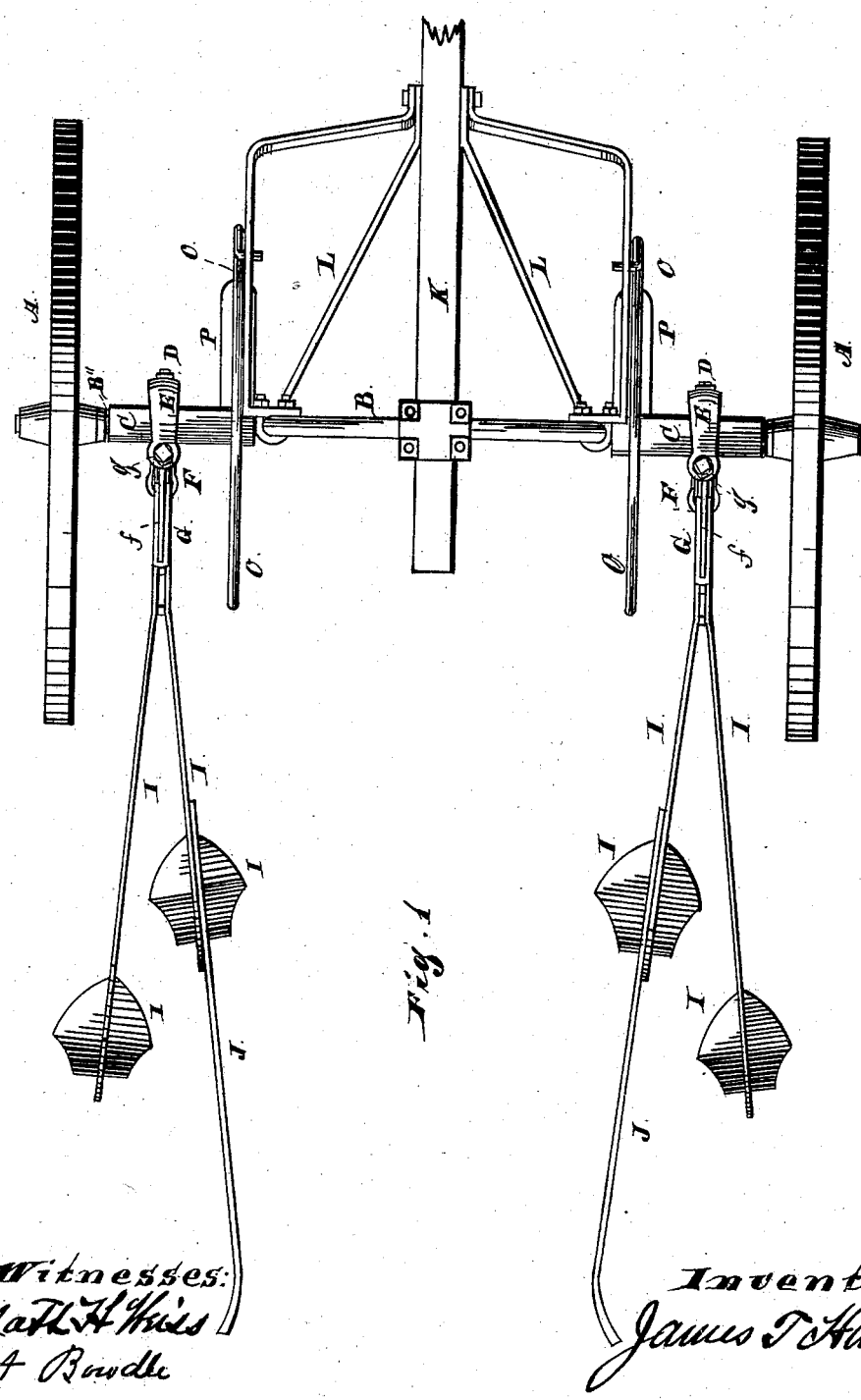
Figure 2:
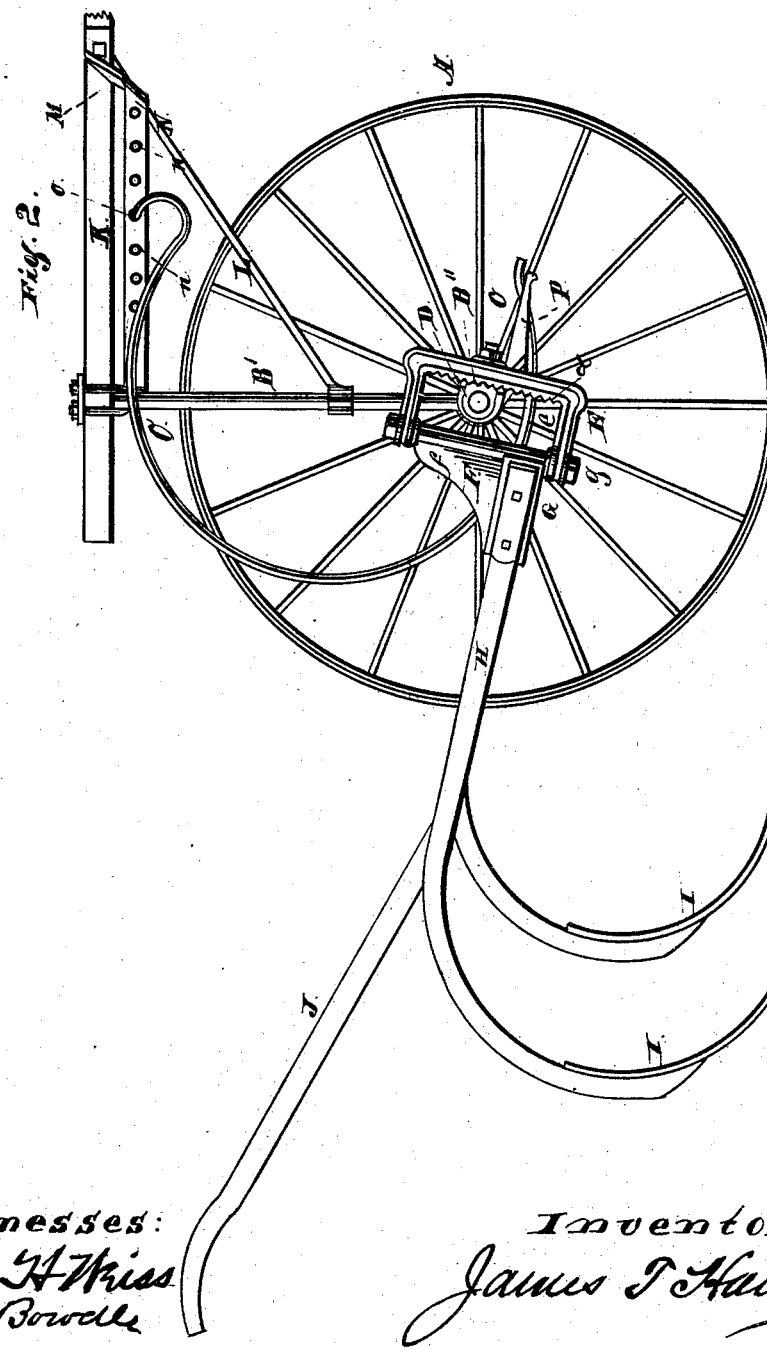
Figure 3:
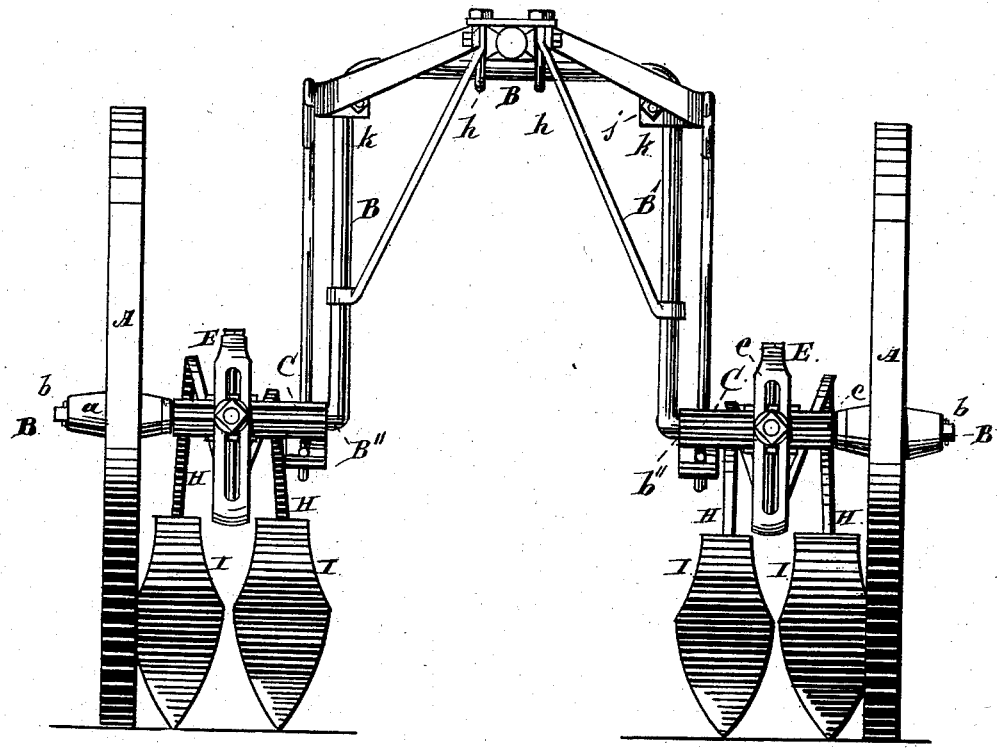
Figure 4:
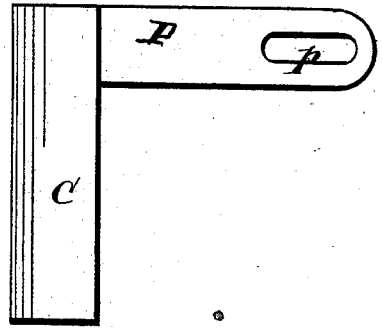
Figure 5:
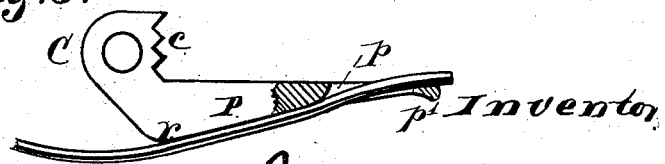

Figure 1 is a top or plan view; Fig. 2, a side elevation; Fig. 3, a front elevation; Fig. 4, an enlarged detail, being a top or plan view of the wheel-spindle collar and the bearing or raising arm thereon; Fig. 5, an enlarged detail, being a side elevation of the parts shown in Fig. 4 with the end of the lifting-spring connected with the bearing or raising arm, the end of which is shown in section.

The lifting or raising of the beams and shovels of a cultivator as ordinarily constructed is attained in some instances with considerable trouble and labor, and to obviate this objection various devices have been applied to cultivators for the purpose of assisting the operator in raising or lifting the beams and shovels and rendering the operation more easy and less laborious. Such devices have been made in various forms and have been applied in various ways; and the object of this invention is to construct a raising or lifting device for the plow beams and shovels which can be easily applied, and which will do the required work in a reliable and effectual manner without interfering with the operation of the plows when in the ground. Its nature consists in providing a curved bar, forming a spring, adjustably attached at one end to the frame or arch of the cultivator and at the other end connected with the collar located on the wheel-spindle, and carrying the beams and shovels; in providing the collar carrying the beams and shovels with an arm or extension to receive the end of the curved bar or spring, and furnish a means for rocking or turning the sleeve to raise or lift the beams and shovels; in providing a support for the upper end of the curved or spring bar, by means of which such end can be adjusted to produce a greater or less resistance in the action of the bar or spring, and in the several parts and combinations of parts hereinafter set forth as new.

In the drawings, A represents the wheels, which may be of any of the usual and well-known forms of construction adapted to be attached to spindles and held thereon by pins $b$, or otherwise, and support the frame and other devices.

B is the horizontal or top portion of the arch; B', the vertical or side portions; B'', the horizontal portions forming the wheel-spindles, and also the support for the sleeve or collar which carries the beam and plows. These parts B B' B'' may be made from a single piece of iron or other suitable material, bent into shape to form the respective parts; or the parts composing this arch or frame may be made of independent pieces, suitably united or joined together to form an arch or frame of the form shown, or other form having a central open portion to allow the cultivator to pass over partly-grown corn, and spindles or wheel portions on which the beams can be supported.

C is the sleeve or collar, located on the wheel-spindles between the hubs $a$ of the wheels and the vertical portion of the arch or frame, and forming a connection for the beams, by which the beams can be raised or lowered vertically. As shown, this sleeve has one face thereof formed straight and provided with serrations or grooves $c$; but it may be formed in some other manner. It has a longitudinal opening for the passage of the wheel-spindle.

D is a clip or eyebolt having a body or main portion, in which is an opening corresponding in shape to the exterior shape of the sleeve or collar C, and having a stem or shank portion, the end of which is screw-threaded to receive a nut. This clip or eyebolt in use receives the sleeve or collar in the form of construction shown.

E is a clevis or stirrup-shaped support, forming one section or part of the beam-coupling. This section or part E may be made of malleable iron or other suitable material, which can be cast or otherwise formed into a stirrup or clevis shape, the end portions of which receive the other section or part of the coupling between them. These end portions are provided with suitable openings for the passage of the bolt $g$, by means of which the two sections of the coupling are united, and, as shown, the inner face of the side bar of this coupling or stirrup is provided with notches or recesses $d$, with which the notches or recesses $c$ of the sleeve or collar C engage and form a firm lock or union between the sleeve or collar and clevis or stirrup when the eyebolt is drawn to place. The shank of the eyebolt passes through a longitudinal slot, $e$, in the side bar of the sleeve or stirrup, as shown in Fig. 3, and by loosening the nut on the end thereof the clip or eyebolt D, with the sleeve or collar, can be raised or lowered within the stirrup or clevis to raise or lower the forward end of the plow-beam and adjust the running depth of the plows.

F is the vertical portion, and G the horizontal portion, of the section of the coupling which is attached to the plow-beam. The part F is cylindrical in shape, as shown, and has a longitudinal opening, through which passes the bolt $g$, and this part corresponds in length, or nearly so, to the distance between the end bars of the sleeve or stirrup, and the part G, as shown, is flat-sided, and its side faces are recessed to receive the forward ends of the plow-beams, which are secured thereto by means of bolts or in some other suitable manner, and these parts F G are joined or united by the flange or rib $f$, as shown in Fig. 2.

H represents the plow-beams, formed of iron or other suitable material, and having their rear ends curved or bent, as shown, or otherwise formed to receive the plows. These beams may be formed of two pieces, one for each plow where two plows are used; or a beam formed of a single piece might be used, the plows being connected therewith by suitable standards in any usual and well-known manner.

I represents the shovels, of any of the usual forms of construction, attached, as usual, to the end of the plow-beams or to the standards.

J represents the handles, formed and attached as usual, by which the beams are operated.

K is the tongue, the rear end of which is attached to the horizontal portion of the arch or frame by clips $h$ and a cross-piece, $i$, as shown, or in some other suitable manner.

L represents the brace-bars attached at their rear ends to the vertical portion B of the arch or frame, and at their front ends by a bolt, $l$, to the side of the tongue, a brace-bar being used on each side.

M represents the brace-bars extending from the tongue to the spring supporting bars. Each bar, as shown, is a continuation of the spring supporting arm or bar, its front end being attached by a bolt or otherwise to the side of the tongue.

N is an arm or bar projecting forward from the vertical portions B′ on each side, and attached to such vertical portions by means of a clip, $j$, and cross-plate K, as shown, or in any suitable manner, so that the arms or bars will be held rigid on the vertical or upright portions B′ of the arch or frame. These bars, as shown, are located at the upper end of each vertical or upright portion B′, and are supported at their forward ends by braces M, as shown in Fig. 1; but they could be otherwise attached and supported. These bars M are each provided with a series of holes, $n$, to receive the upper end of the curved bar or spring.

O represents curved bars or springs, which may be made of steel or other suitable material possessing elastic qualities. These bars or springs are each made from a single piece of material, and a spring or bar is to be used on each side of the cultivator. The upper end of each spring, as shown, has a small curve or bend, forming an open eye, and the extreme end is turned or bent at right angles and forms a means for locking or engaging the upper end of the spring with the bar or support N by being inserted in the holes $n$, the engagement with the hole farther forward or back producing the required amount of tension for the spring to act. This curved bar or spring is bent or curved in such shape that when in place it will extend back from its point of attachment at its upper end, and around forward again below or under the wheel-spindle, as shown in Fig. 2.

P is an arm or extension formed with or secured to the collar or sleeve C, and extending forward from such sleeve or collar, and having in its outward end a slot, $p$, through which the lower end of the spring O passes and rests on the end $p'$ of the arm or extension at the end of the slot, the opposite end of the slot having its under face, $q$, rounded off, as shown in Fig. 5. The under face or side of P is formed inclined, and at a point in line, or nearly so, with the front edge of the collar or sleeve is formed a shoulder or bearing, $r$, against which the bar or spring O comes in contact, so as to give an increased action to the lower end of the spring between the shoulder $r$ and the end $p'$ of the arm or extension. As shown, this arm or extension is formed with the collar or sleeve; but it could be formed of an independent piece secured to the sleeve by clips or bolts and plates.

The spring O, arm or extension P, and bar N form the devices to assist in raising or lifting the plow-beams, and the other parts of the complete cultivator may be of the form shown and described or of some other suitable form.

In operation the spring or curved bar O is attached at its upper end by being connected to the bar N, and the amount of pressure which it is desired the spring shall exert is adjusted by making the attachment nearer to or farther from the upright or vertical portion B′ in one of the openings $n$; the farther forward the connection is made the greater will be the pressure. The lower end of this spring or curved bar O is passed beneath the sleeve or collar which supports the plow beams and shovels, its extreme end passing through the slot $p$ and resting on the bar or end piece, $p'$, so that the force of the spring will have a downward action on the arm or extension P, which will act to turn the sleeve or collar in a forward direction and raise the plow beams and shovels; and the arrangement of these parts is such that when the plows are in the ground their resistance will overcome the force of the spring, so that the spring will be non-acting when the machine is in use, but will be brought into action as the operator raises the plow beams and shovels, and assist in such elevating or raising.

This elevating or raising device is very simple in construction, and can be easily applied to the ordinary forms of cultivators using an arched axle or frame and a collar or sleeve supporting the plow beams and shovels, and mounted on the wheel-spindle or lower horizontal portion of the arch or frame, as all that is necessary to be done is to attach the adjusting-bar to the arch or frame and secure the arm or extension P in position on the collar or sleeve, and connect the spring or curved bar at its upper end to the support or bar N and at its lower end with the arm or extension P, when the device is ready for use, the desired amount of force being adjusted by connecting the upper end at the proper point for the spring to act.

The lower end of the spring or curved bar O might be formed into an open eye to be slipped onto or over the end piece, $p'$, to form a connection which would not become accidentally disconnected in use.

The fulcrum formed by the shoulder $r$ is not absolutely necessary; but by using it an increased action for the lower end of the spring forward of this fulcrum is produced.

Other means than the bars N can be used for attaching the upper end of the spring or curved bars O, and these bars N, when used, might be attached to the tongue or other part of the machine instead of to the vertical portions of the arch or frame.

In use the operator takes hold of the handles and draws the beam down so that the plows can enter the ground and do their work, and when in the ground the arm or extension P will be raised at its outer end, contracting the spring or curved bar O, so that such curved or spring bar will exert a downward pressure on the arm or extension, which pressure is overcome by the grasp of the operator on the handles and the resistance of the shovels in the ground. As soon as this resistance is released the spring acts and throws the arm or extension down, assisting the operator to the extent of the force of the spring in elevating or raising the beams.

This device, while simple in construction and easily attached, will be found very efficient and reliable in use for the purpose for which it is intended.

The braces M, instead of being a continuation of the bars N, might be independent pieces with their outer ends bolted or otherwise securely fastened to the forward ends of the bars N, and their inner ends bolted or otherwise secured to the tongue or other part of the frame.

The bars N, with their holes $n$, form the means for adjusting the spring to give it the required degree of tension to act on the arm or lever P with sufficient pressure to assist the lifting.

The curved bars or springs O can be attached at either end in some other manner from that shown and described for connecting them to the tension-bars N, and raising arm or lever P; but such attachment should be one that will not become readily or easily detached or displaced in use. The curvature of the bars or springs O will depend upon the relative proportions of the machine to which they are applied, the curvature or bend in each case being one that will exert a downward pressure on the raising arm or lever when the shovels are in the ground, and offer sufficient resistance when the beams are elevated to prevent the beams from being too readily thrown down.

What I claim as new, and desire to secure by Letters Patent, is—

1. In a cultivator, the curved bars or springs O, connected at their lower ends with an arm or extension located on the sleeve or collar which carries the plow beams and shovels, and having their upper ends adjustably connected with the frame or arch of the cultivator for adapting the bars or springs to resist the varying strains incident to working light and heavy soil, substantially as described.

2. The combination, with a cultivator-frame and plow-beams or drag-bars, of a spring or curved bar, O, and adjusting-bar N, pipe box or sleeve C, having an arm, P, and the coupling E F, substantially as described.

3. In a cultivator, the curved bar or spring O, in combination with the adjusting or tension bar N and arm or extension P, having a fulcrum, $r$, and attached to the beam sleeve or collar, substantially as and for the purposes specified.

JAMES T. HAMILTON.

Witnesses:
MATT H. WEISS,
J. A. BOWDLE.